United States Patent
Sokolov

(10) Patent No.: US 7,058,934 B2
(45) Date of Patent: *Jun. 6, 2006

(54) FRAMEWORKS FOR GENERATION OF JAVA MACRO INSTRUCTIONS FOR INSTANTIATING JAVA OBJECTS

(75) Inventor: Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 09/939,310

(22) Filed: Aug. 24, 2001

(65) Prior Publication Data

US 2003/0041322 A1    Feb. 27, 2003

(51) Int. Cl.
*G06F 9/45* (2006.01)
(52) U.S. Cl. ........................ 717/147; 717/139
(58) Field of Classification Search ........ 717/136–139, 717/118, 147
See application file for complete search history.

(56) References Cited

U.S. PATENT DOCUMENTS

| | | |
|---|---|---|
| 4,086,626 A | 4/1978 | Chung |
| 4,199,811 A | 4/1980 | Borgerson et al. |
| 4,667,290 A * | 5/1987 | Goss et al. ............... 717/147 |
| 4,910,731 A | 3/1990 | Sakurai et al. |
| 5,418,964 A | 5/1995 | Conner et al. |
| 5,542,059 A | 7/1996 | Blomgren |
| 5,815,718 A | 9/1998 | Tock |
| 5,838,980 A | 11/1998 | Guillen et al. |
| 5,872,978 A | 2/1999 | Hoskins |
| 5,878,430 A | 3/1999 | Lafuse |
| 5,893,084 A | 4/1999 | Morgan et al. |
| 5,899,997 A | 5/1999 | Ellacott |

(Continued)

FOREIGN PATENT DOCUMENTS

EP    0810522 A2    12/1997

(Continued)

OTHER PUBLICATIONS

Jon Meyer & Troy Downing, Java Virtual Machine, 1997, O'Reilly & Associates, Inc. pp. 46, 130, 132, 235-241.*

(Continued)

*Primary Examiner*—Wei Y. Zhen
*Assistant Examiner*—Qamrun Nahar
(74) *Attorney, Agent, or Firm*—Beyer Weaver & Thomas, LLP

(57) ABSTRACT

Techniques for generation of Java macro instructions suitable for use in Java computing environments are disclosed. As such, the techniques can be implemented in a Java virtual machine to efficiently execute Java instructions. As will be appreciated, a Java macro instruction can be substituted for two or more Java Bytecode instructions. This, in turn, reduces the number of Java instructions that are executed by the interpreter. As a result, the performance of virtual machines, especially those operating with limited resources, is improved. A Java macro instruction can be generated for conventional Java instruction sequences or sequences of Java instruction that are provided in a reduced set of instruction. In any case, sequences that are frequently encountered can be replaced by a Java macro instruction. These sequences are typically encountered when Java objects are instantiated, during programming loops, and when a local variables are assigned a value.

21 Claims, 15 Drawing Sheets

U.S. PATENT DOCUMENTS

| | | | |
|---|---|---|---|
| 5,903,761 A | 5/1999 | Tyma | |
| 5,920,720 A | 7/1999 | Toutonghi et al. | |
| 5,970,242 A * | 10/1999 | O'Connor et al. | 717/100 |
| 5,978,585 A | 11/1999 | Crelier | |
| 6,003,038 A | 12/1999 | Chen | |
| 6,021,469 A | 2/2000 | Tremblay et al. | |
| 6,026,237 A | 2/2000 | Berry et al. | |
| 6,026,485 A * | 2/2000 | O'Connor et al. | 717/148 |
| 6,047,125 A | 4/2000 | Agesen et al. | |
| 6,072,951 A | 6/2000 | Donovan et al. | |
| 6,072,953 A | 6/2000 | Cohen et al. | |
| 6,075,942 A | 6/2000 | Cartwright, Jr. | |
| 6,081,665 A | 6/2000 | Nilsen et al. | |
| 6,096,095 A | 8/2000 | Halstead | |
| 6,101,560 A * | 8/2000 | Agesen et al. | 711/132 |
| 6,101,580 A | 8/2000 | Agesen et al. | |
| 6,118,940 A * | 9/2000 | Alexander et al. | 717/127 |
| 6,151,618 A | 11/2000 | Wahbe et al. | |
| 6,151,703 A | 11/2000 | Crelier | |
| 6,163,780 A | 12/2000 | Ross | |
| 6,182,202 B1 | 1/2001 | Muthukkaruppan | |
| 6,202,208 B1 | 3/2001 | Holiday, Jr. | |
| 6,205,578 B1 | 3/2001 | Grove | |
| 6,223,202 B1 | 4/2001 | Bayeh | |
| 6,260,187 B1 * | 7/2001 | Cirne | 717/110 |
| 6,282,702 B1 | 8/2001 | Ungar | |
| 6,292,883 B1 * | 9/2001 | Augusteijn et al. | 712/209 |
| 6,317,872 B1 | 11/2001 | Gee et al. | |
| 6,324,685 B1 | 11/2001 | Balassanian | |
| 6,330,709 B1 | 12/2001 | Johnson et al. | |
| 6,332,215 B1 | 12/2001 | Patel et al. | |
| 6,338,160 B1 | 1/2002 | Patel et al. | |
| 6,339,841 B1 | 1/2002 | Merrick et al. | |
| 6,349,377 B1 | 2/2002 | Lindwer | |
| 6,372,286 B1 | 4/2002 | Azuma et al. | |
| 6,374,286 B1 | 4/2002 | Gee et al. | |
| 6,412,108 B1 * | 6/2002 | Blandy et al. | 717/152 |
| 6,427,228 B1 * | 7/2002 | Wigger | 717/111 |
| 6,434,625 B1 | 8/2002 | Loen | |
| 6,434,694 B1 | 8/2002 | Slaughter et al. | |
| 6,442,753 B1 | 8/2002 | Gerard et al. | |
| 6,446,084 B1 | 9/2002 | Shaylor et al. | |
| 6,446,254 B1 | 9/2002 | Chapman et al. | |
| 6,467,037 B1 | 10/2002 | Griesemer | |
| 6,477,702 B1 | 11/2002 | Yellin et al. | |
| 6,496,871 B1 | 12/2002 | Jagannathan et al. | |
| 6,553,565 B1 | 4/2003 | Click, Jr. et al. | |
| 6,557,023 B1 | 4/2003 | Taivalsaari | |
| 6,557,054 B1 | 4/2003 | Reisman | |
| 6,571,388 B1 | 5/2003 | Venkatraman et al. | |
| 6,584,612 B1 | 6/2003 | Mueller et al. | |
| 6,618,737 B1 | 9/2003 | Aridor et al. | |
| 6,643,711 B1 | 11/2003 | Bracha et al. | |
| 6,658,421 B1 | 12/2003 | Seshadri | |
| 6,684,394 B1 | 1/2004 | Shann | |
| 6,704,803 B1 | 3/2004 | Wilson et al. | |
| 6,704,923 B1 | 3/2004 | Gosling | |
| 6,738,977 B1 | 5/2004 | Berry et al. | |
| 6,851,108 B1 | 2/2005 | Syme et al. | |
| 6,851,111 B1 | 2/2005 | McGuire et al. | |
| 2002/0046298 A1 * | 4/2002 | Bak et al. | 709/310 |
| 2002/0170041 A1 * | 11/2002 | Shann | 717/141 |
| 2002/0170043 A1 | 11/2002 | Bagley et al. | |
| 2002/0188726 A1 | 12/2002 | Schick et al. | |

FOREIGN PATENT DOCUMENTS

| | | |
|---|---|---|
| EP | 0943989 A2 | 9/1999 |
| EP | 0 996 059 A2 | 4/2000 |
| WO | WO 99/18484 | 4/1999 |
| WO | WO99/31576 | 6/1999 |
| WO | WO 99/61981 | 12/1999 |
| WO | WO01/22213 A2 | 3/2001 |
| WO | WO02/41145 A2 | 5/2002 |
| WO | WO02/077807 A1 | 10/2002 |

OTHER PUBLICATIONS

Tim Ritchey, Java!, 1995, New Riders Publishing, pp. 326-343.*

Clausen, et al., "Java Bytecode Compression for Low-End Embedded Systems", 2000, ACM, p. 471-489.*

Tim Ritchey, Java!, 1995, New Riders Publishing, pp. 326-343.*

Microsoft Press Computer Dictionary Third Edition, 1997, pp. 294-295.*

Jon Meyer & Troy Downing, Java Virtual Machine, 1997, O'Reilly & Associates, Inc. pp. 46, 56-57, 74-75, 389, 391.*

Clausen et al., "Java Bytecode Compression for Low-End Embedded Systems," May 2000, ACM.*

Lindholm et al., "The Java™ Virtual Machine Specification," (Sep., 1996), Sun Microsystems, Inc., Chapters 1-10 (173 pp.).

Draft International J Consortium Specification, J Executable File Format (JEFF), J Consortium Specification No. Feb. 2000, 1999, 2000.

Lambright H D, "Java Bytecode Optimizations" Proceedings of IEEE Compcon '97. San Jose, Feb. 23-26, 1997, pp. 206-210, XP-000751784.

Accomazzo E et al., "Integrating intermediate Code Optimization with Retargetable Code Generation" Microprocessing and Microprogramming, Elsevier Science Publishers, BV. Amsterdam, NL, vol. 30, No. 1/5, Aug. 1, 1990, pp. 475-481, XP000141684.

McNeley KJ et al., "Emulating a Complex Instruction Set Computer With a Reduced Instruction Set Computer," IEEE Micro, IEEE Inc. New York, US, vol. 7, No. 1, Feb. 1987, pp. 60-71. XP-000827611.

Jean-Paul Billon, "JEFFWEG4 (J Executable File Format), Release 1.0 Achievements, Sep. 29, 2000," J Consortium Jeff Working Group, pp. 1-24. XP-002208358.

Microsoft Press Computer Dictionary Third Edition, pp. 294-295.

Case B: "Implementing The Java Virtual Machine *Java's Complex Instruction Set Can Be Built in Software or Hardware*," Microprocessor Report, vol. 10, No. 4, Mar. 25, 1996, pp. 12-17. XP-000987276.

Chang et al., "EJVM: an economic Java run-time environment for embedded devices," Software Practice & Experience, 2001, John Wiley & Sons, Ltd., vol. 31, pp. 129-146. XP-000987539.

Gosling et al., "The Java™ Language Specification", Aug. 1, 1996, pp. 215-236. XP 002042923.

Zhenyu Qian, "A formal Specification of Java™ Virtual Machine Instructions," Technical Report, University Bremen; Nov. 1997, pp. 1-32. XP-002255760.

Piumarta et al., "Optimizing Direct Threaded Code by Selective Inlining," Association for Computing Machinery, vol. 33, No. 5, pp. 291-300, May 1, 1998.XP-000766278.

Tommesani, "Programming models".

Examination Report dated Aug. 8, 2005 from the GB Application No.: GB0324568.5, 5 pages.

Patrice Pominville, "Annotating Java Bytecode," Project Report, McGill University, Online, Apr. 2000, pp. 1-7. XP-002254149.

Yourst, "Inside Java Class Files," Dr. Dobb's Journal, Jan. 1998, XP-002254150.

Hummel et al., "Annotating the Java bytecodes in support of optimization," Concurrency: Practice and Experience, John Wiley and Sons, vol. 9(11), Nov. 1997, pp. 1003-1016. XP-001131083.

Lindholm et al., "The Java Virtual Machine Specification," Second Edition, Apr. 1999, pp. 117-132. XP-002254151.

Dahm, Markus, "Byte Code Engineering", 1999, Java Information Tag, Proceedings of JIT' 99: Java-Informations'Tage, Dusseldorf, Germany, vol. 20-21, pp. 267-277, XP-002262007.

Bill Venners, "How the Java virtual machine handles method invocation and return" Java World, Jun. 1997, pp. 1-10.

Goldberg, "A specification of java loading and bytecode verification," ACM, pp. 49-58, 1998.

Chang et al. "Type-Based Verification of Assembly Language for Compiler Debugging," ACM TLDI, pp. 91-102, Jan. 2005.

Qian et al., "A Formal Specification of Java™ Class Loading," ACM OOPSLA, pp. 325-336, 2000.

Krintz et al., "Reducing Transfer Delay Using Java Class File Splitting and Prefetching," ACM OOPSLA, pp. 276-291 Nov. 1999.

Chilimbi et al., "Cache-Conscious Structure Definition", p. 13-24, 1999 ACM.

Nicol et al., "Empirical Study of parallel Trace-Driven LRU Cache Simulators", p. 166-169, 1995 IEEE.

Office Action mailed Aug. 27, 2004 from U.S. Appl. No. 09/939,106.

Amendment A in response to the Office Action mailed Aug. 27, 2004 from U.S. Appl. No. 09/939,106.

Final Office Action mailed Apr. 22, 2005 from U.S. Appl. No. 09/939,106.

Office Action mailed Jun. 18, 2004 from U.S. Appl. No. 09/819,120.

Final Office Action mailed Feb. 14, 2005 from U.S. Appl. No. 09/819,120.

Office Action mailed Jun. 27, 2005 from U.S. Appl. No. 09/819,120.

* cited by examiner

LOAD
| iload |
| fload |
| aload |
| iload_0 |
| iload_1 |
| iload_2 |
| iload_3 |
| fload_1 |
| fload_2 |
| fload_3 |
| aload_0 |
| aload_1 |
| aload_2 |
| aload_3 |

LOADL
| lload |
| dload |
| lload_0 |
| lload_1 |
| lload_2 |
| lload_3 |
| fload_0 |
| dload_0 |
| dload_1 |
| dload_2 |
| dload_3 |

Fig. 10B      Fig. 10C

| lcmp | OP_LSUB, OP_JMPEQ |
|---|---|
| fcmpl | OP_FSUB, OP_JMPLE |
| fcmpg | OP_FSUB, OP_JMPGE |
| dcmpl | OP_DCMP, OP_JMPLE |
| dcmpg | OP_DCMP, OP_JMPGE |

Fig. 11A

| if_icmpeq | OP_ISUB, OP_JMPEQ |
|---|---|
| if_icmpne | OP_ISUB, OP_JMPNE |
| if_icmplt | OP_ISUB, OP_JMPLT |
| if_icmpge | OP_ISUB, OP_JMPGE |
| if_icmpgt | OP_ISUB, OP_JMPGT |
| if_icmple | OP_ISUB, OP_JMPLE |
| if_acmpeq | OP_ISUB, OP_JMPEQ |
| if_acmpne | OP_ISUB, OP_JMPNE |

Fig. 11B

FRAMEWORKS FOR GENERATION OF JAVA MACRO INSTRUCTIONS FOR INSTANTIATING JAVA OBJECTS

CROSS-REFERENCE TO RELATED APPLICATION

This application is related to concurrently filed U.S. patent application Ser. No. 09/,939,122, filed Aug. 23, 2002, entitled "FRAMEWORKS FOR GENERATION OF JAVA MACRO INSTRUCTIONS IN JAVA COMPUTING ENVIRONMENTS," which is hereby incorporated herein by reference for all purposes.

This application is related to concurrently filed U.S. patent application Ser. No. 09/938,915, filed Aug. 24, 2001, entitled "FRAMEWORKS FOR GENERATION OF JAVA MACRO INSTRUCTIONS FOR PERFORMING PROGRAMMING LOOPS," which is hereby incorporated herein by reference for all purposes.

This application is related to concurrently filed U.S. patent application Ser. No. 09/939,106, filed Aug. 24, 2001, entitled "FRAMEWORKS FOR GENERATION OF JAVA MACRO INSTRUCTIONS FOR STORING VALUES INTO LOCAL VARIABLES," which is hereby incorporated herein by reference for all purposes.

This application is related to U.S. patent application Ser. No. 09/819,120, filed Mar. 27, 2001, entitled "REDUCED INSTRUCTION SET FOR JAVA VIRTUAL MACHINES," and hereby incorporated herein by reference for all purposes.

This application is related to U.S. patent application Ser. No. 09/703,449, filed Oct. 31, 2000, entitled "FRAMEWORKS FOR LOADING AND EXECUTION OF OBJECT-BASED PROGRAMS," which is hereby incorporated herein by reference for all purposes.

This application is related to U.S. patent application Ser. No. 09/820,097, filed Mar. 27, 2001, entitled "ENHANCED VIRTUAL MACHINE INSTRUCTIONS," which is also hereby incorporated herein by reference for all purposes.

BACKGROUND OF THE INVENTION

The present invention relates generally to Java programming environments, and more particularly, to frameworks for generation of Java macro instructions in Java computing environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a Java virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed, without modification, on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include, or have references to, several Java methods associated with the Java class which is represented in the class file 100. One of these methods is an initialization method used to initialize the Java class after the class file has been loaded by the virtual machine but before other methods can be invoked. In other words, typically, an initialization method is used to initialize a Java class before the classes can be used.

A conventional virtual machine's interpreter decodes and executes the Java Bytecode instructions, one instruction at a time, during execution, e.g., "at runtime." Typically, several operations have to be performed to obtain the information that is necessary to execute a Java instruction. Furthermore, there is a significant overhead associated with dispatching Bytecode instructions. In other words, the Java interpreter has to perform a significant amount of processing in order to switch from one instruction to the next. Accordingly, it is highly desirable to reduce the number of times the interpreter has to dispatch instructions. This, in turn, can improve the performance of virtual machines, especially those operating with limited resources.

In view of the foregoing, improved frameworks for execution of Java Bytecode instructions are needed.

SUMMARY OF THE INVENTION

Broadly speaking, the invention relates to Java programming environments, and more particularly, to frameworks for generation of Java macro instructions in Java computing environments. Accordingly, techniques for generation of Java macro instructions suitable for use in Java computing environments are disclosed. As such, the techniques can be implemented in a Java virtual machine to efficiently execute Java instructions. As will be appreciated, a Java macro instruction can be substituted for two or more Java Bytecode instructions. This, in turn, reduces the number of Java instructions that are executed by the interpreter. As a result, the performance of virtual machines, especially those operating with limited resources, is improved.

The invention can be implemented in numerous ways, including as a method, an apparatus, a computer readable medium, and a database system. Several embodiments of the invention are discussed below.

One embodiment of the invention includes a Java macro instruction representing a sequence of Java Bytecode instructions consisting of a Java instantiation Bytecode instruction immediately followed by a Java Duplicate the stack Bytecode instruction. The Java macro instruction can be executed by a Java virtual machine operating in a Java computing environment. When the Java macro instruction is executed, the operations that are performed by the conventional sequence of Java Bytecode instructions are performed.

Another embodiment of the invention includes a Java macro instruction representing a sequence of Java Bytecode instructions consisting of an inventive Java New Bytecode instruction immediately followed by an inventive Java Dup Bytecode instruction. The Java macro instruction can be executed by a Java virtual machine operating in a Java computing environment. When the Java macro instruction is executed, the operations that are performed by the sequence of Java Bytecode instructions are performed.

As a computer readable media including computer program code for a Java macro instruction, one embodiment of the invention includes a Java macro instruction representing a sequence of Java Bytecode instructions consisting of an inventive Java New Bytecode instruction immediately followed by an inventive Java Dup Bytecode instruction. The Java macro instruction can be executed by a Java virtual machine operating in a Java computing environment. When the Java macro instruction is executed, the operations that are performed by the sequence of Java Bytecode instructions are performed.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 10B illustrates a set of Java Bytecode instructions for loading 4 byte local variables that can be represented by an inventive "Load" command in accordance with one embodiment of the invention.

FIG. 10C illustrates a set of Java Bytecode instructions for loading 8 byte local variables in accordance with one embodiment of the invention.

FIGS. 11A and 11B illustrate some Java conventional Bytecode instructions for performing conditional flow operations which can be represented by two inventive virtual machine instructions in accordance with one embodiment of the invention.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, techniques for generation of Java macro instructions suitable for use in Java computing environments are disclosed. As such, the techniques can be implemented in a Java virtual machine to efficiently execute Java instructions. As will be appreciated, a Java macro instruction can be substituted for two or more Java Bytecode instructions. This, in turn, reduces the number of Java instructions that are executed by the interpreter. As a result, the performance of virtual machines, especially those operating with limited resources, is improved.

Embodiments of the invention are discussed below with reference to FIGS. 2A–13C. However, those skilled in the art will readily appreciate that the detailed description given herein with respect to these figures is for explanatory purposes only as the invention extends beyond these limited embodiments.

Figure 1A:
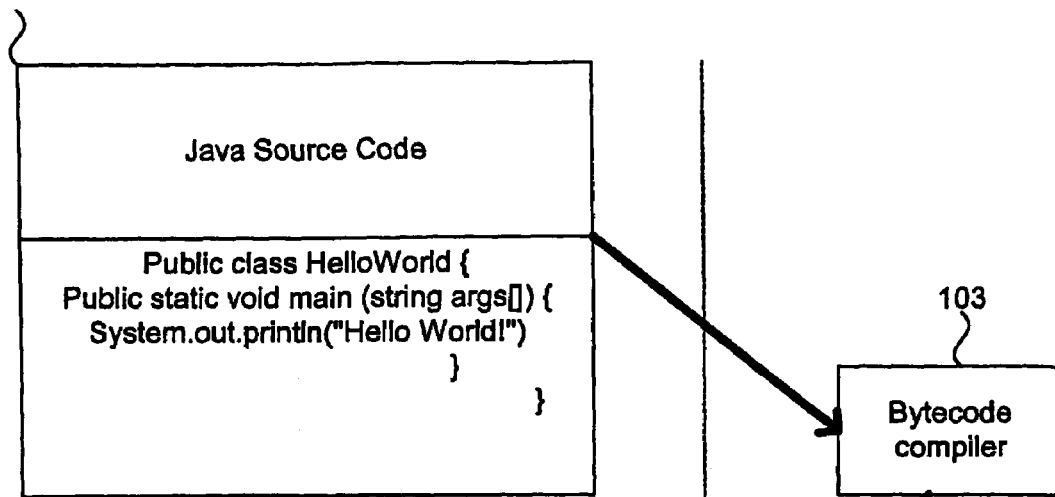
FIG. 1A shows a progression of a simple piece of a Java source code through execution by an interpreter, the Java virtual machine.
Figure 1A:
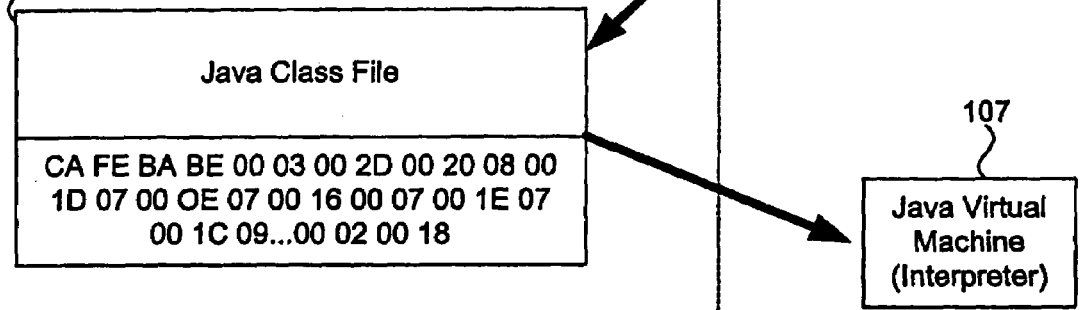
Figure 1B:
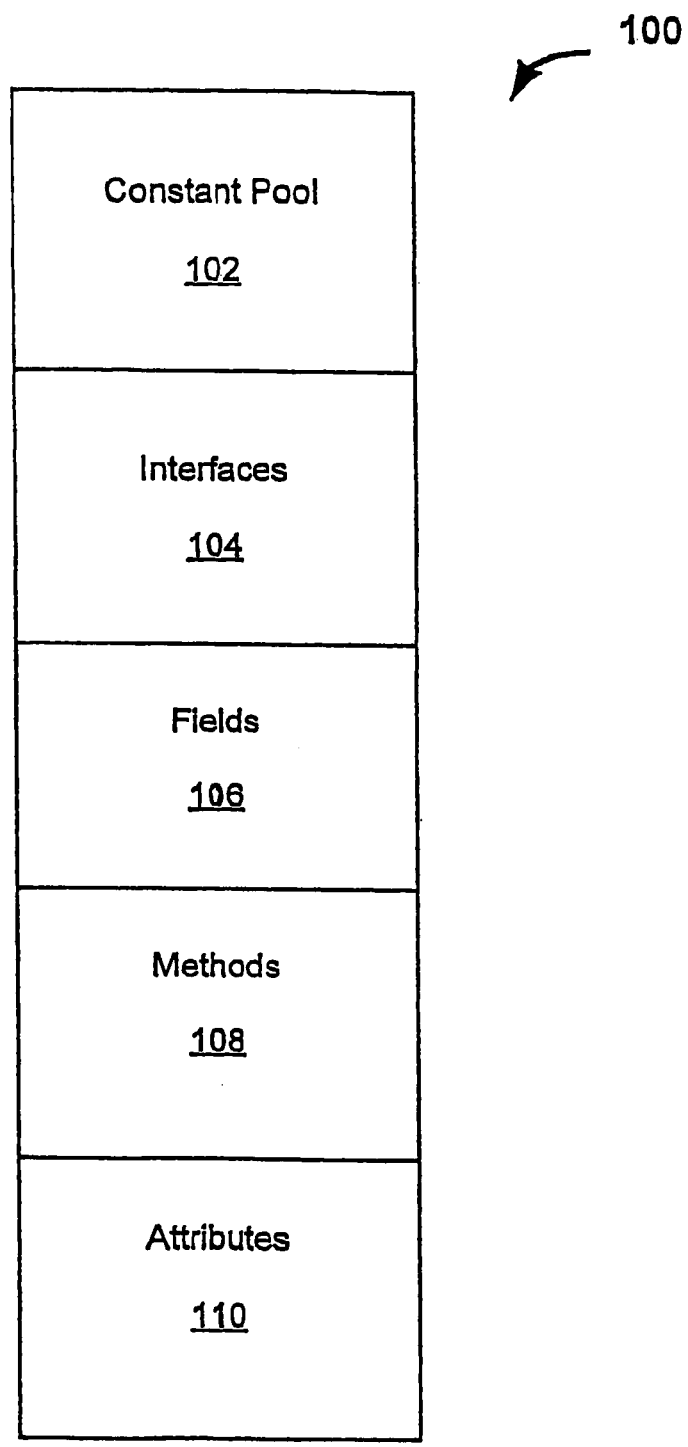
FIG. 1B illustrates a simplified class file.
Figure 2A:
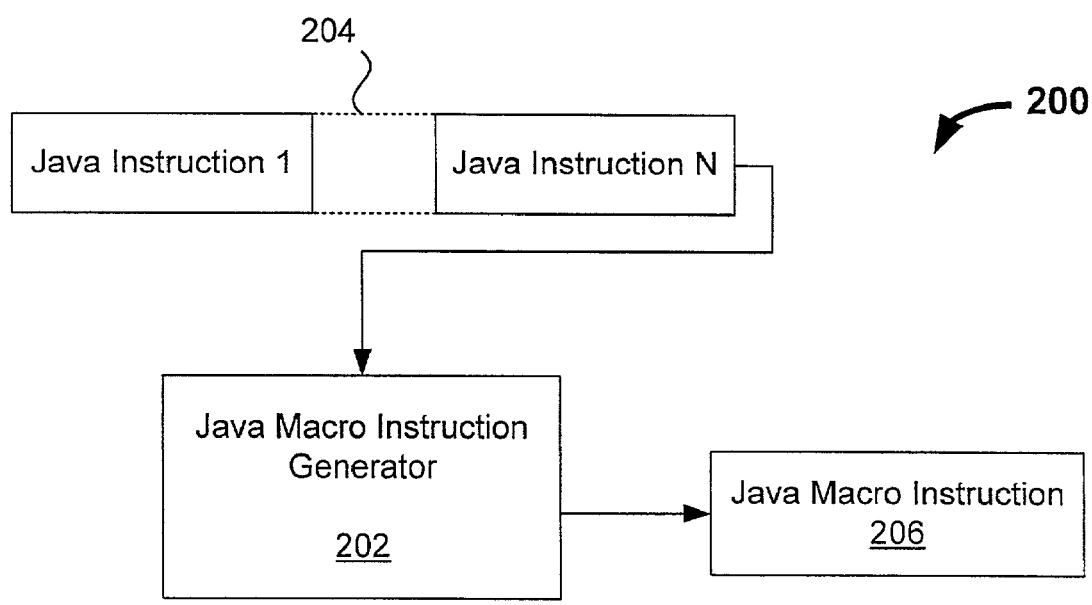
FIGS. 2A–2B illustrate Java computing environments including Java macro instruction generators.

FIG. 2A illustrates a Java computing environment 200 in accordance with one embodiment of the invention. The Java computing environment 200 includes a Java macro instruction generator 202 suitable for generation of macro instructions which are suitable for execution by an interpreter. As shown in FIG. 2A, the Java macro instruction generator 202 can read a stream of Java Bytecode instructions 204 (Java Bytecode instructions 1–N). Moreover, the Java macro instruction generator 202 can produce a Java macro instruction 206 which represents two or more Java Bytecode instructions in the stream 204.

The Java Bytecode instructions in the stream 204 can be conventional Java Bytecode instructions, for example, conventional instructions "new" and "dup" which typically appear in sequence in order to instantiate a Java object. As will be appreciated by those skilled in the art, certain sequences appear frequently during the execution of Java programs. Thus, replacing such sequences with a single macro instruction can reduce the overhead associated with dispatching Java Bytecode instructions. As a result, the performance of virtual machines, especially those operating with limited resources, is enhanced.

Figure 2B:
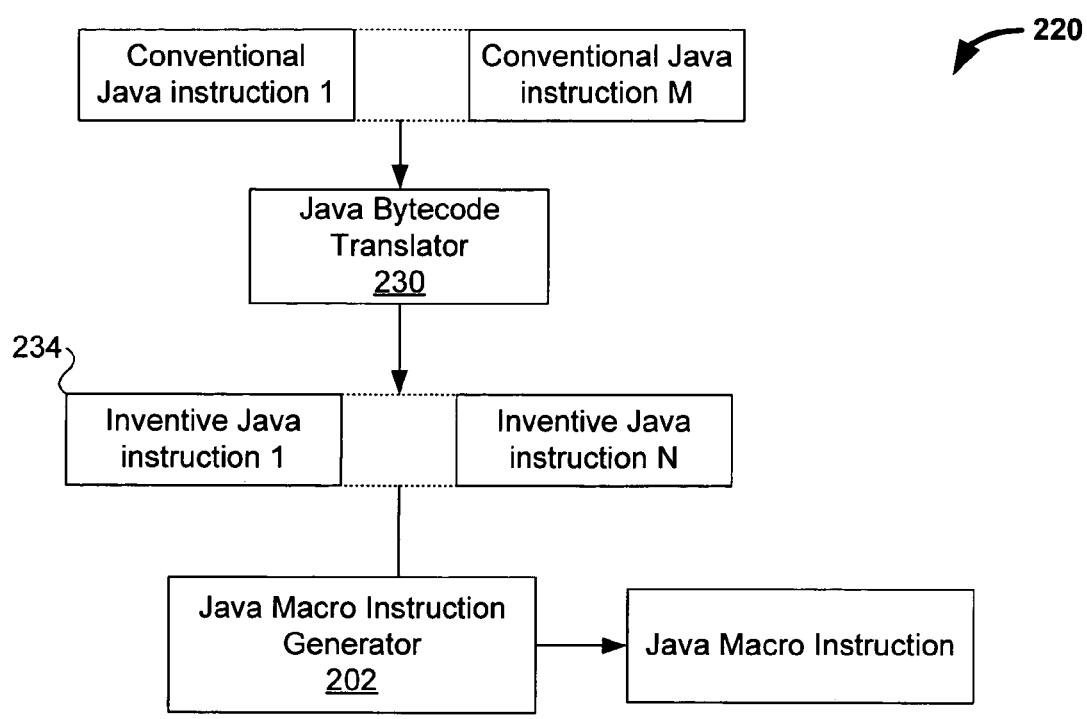

It should be noted that the Java macro instruction generator 202 can also be used in conjunction with a Java Bytecode translator in accordance with one preferred embodiment of the invention. Referring now to FIG. 2B, a Java Bytecode translator 230 operates to translate conventional Java instructions 1–M into inventive Java instructions 234 (1–N), wherein N is an integer less than the integer M. More details about the Java Bytecode translator 230 and inventive Java instructions 1–N are described in U.S. patent application Ser. No. 09/819,120, entitled "REDUCED INSTRUCTION SET FOR JAVA VIRTUAL MACHINES," and U.S. patent application Ser. No. 09/820,097, entitled "ENHANCED VIRTUAL MACHINE INSTRUCTIONS." As will be appreciated, the use of the inventive Java instructions in conjunction with the Java macro instruction generator can further enhance the performance of virtual machines.

It should also be noted that the Java macro instruction can be internally represented in the virtual machine as a pair of Java streams in accordance with one embodiment of the invention. The pair of Java streams can be a code stream and a data stream. The code stream is suitable for containing the code portion of Java macro instructions, and the data stream is suitable for containing a data portion of said Java macro instruction. More details about representing instructions as a pair of streams can be found in the U.S. patent application Ser. No. 09/703,449, entitled "FRAMEWORKS FOR LOADING AND EXECUTION OF OBJECT-BASED PROGRAMS."

Figure 3:
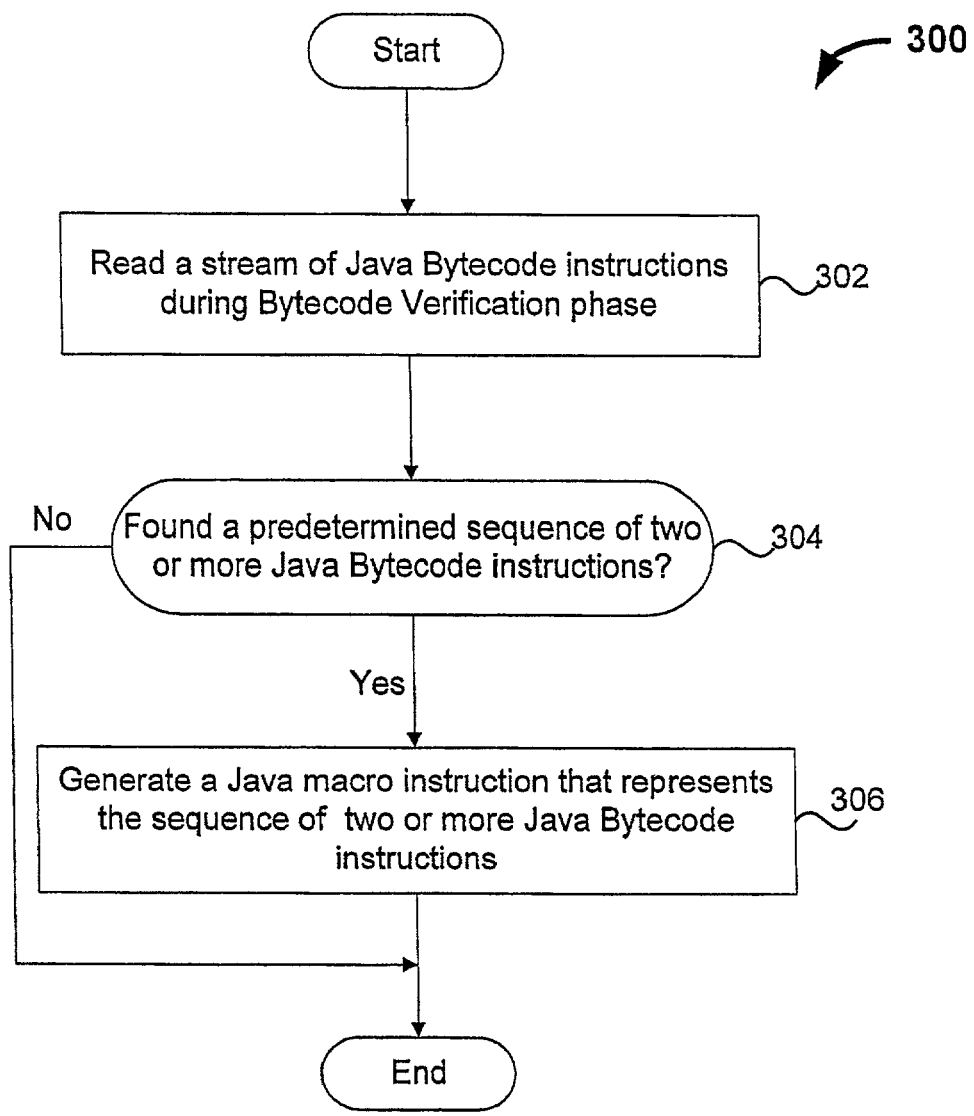
FIG. 3 illustrates a method for generating Java macro instructions in accordance with one embodiment of the invention.

FIG. 3 illustrates a method 300 for generating Java macro instructions in accordance with one embodiment of the invention. The method 300 can be used, for example, by the Java macro instruction generator 202 of FIGS. 2A–B. Initially, at operation 302, a stream of Java Bytecode instructions is read. As will be appreciated, the stream of Java Bytecode instructions can be read during the Bytecode verification phase. Java Bytecode verification is typically performed in order to ensure the accuracy of Java instructions. As such, operation 302 can be efficiently performed during Bytecode verification since typically there is a need to verify Bytecode instructions.

Next, at operation 304, a determination is made as to whether a predetermined sequence of two or more Java Bytecode instructions has been found. If it is determined at operation 304 that a predetermined sequence of two or more Java Bytecode instructions has not been found, the method 300 ends. However, if it is determined at operation 304 that a predetermined sequence of two or more Java Bytecode instructions has been found, the method 300 proceeds to operation 306 where a Java macro instruction that represents the sequence of two or more Java Bytecode instructions is generated. The method 300 ends following operation 306. It should be noted that operations 304 and 306 can also be performed during the Java Bytecode verification phase.

Figure 4:
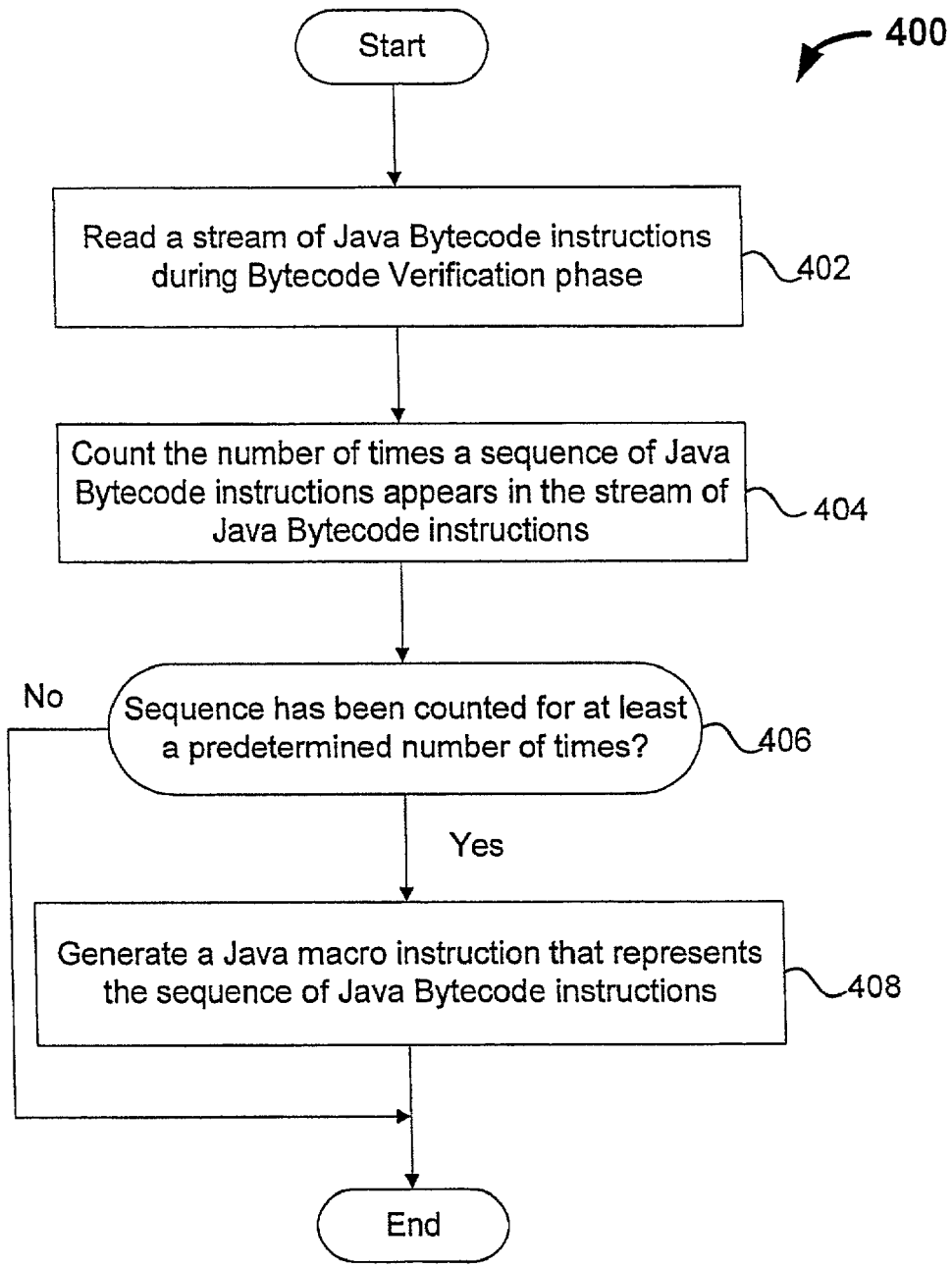
FIG. 4 illustrates a method for generating Java macro instructions in accordance with another embodiment of the invention.

FIG. 4 illustrates a method 400 for generating Java macro instructions in accordance with another embodiment of the invention. The method 400 can be used, for example, by the Java macro instruction generator 202 of FIGS. 2A–B. Initially, at operation 402, a stream of Java Bytecode instructions is read. Again, operation 402 can efficiently be performed during Bytecode verification since Bytecode verification is typically performed anyway.

Next, at operation 404, the number of times a sequence of Java Bytecode instructions appear in the stream of Java Bytecode instructions is counted. Thereafter, at operation 406, a determination is made as to whether the sequence has been counted for at least a predetermined number of times. If it is determined at operation 406 that the sequence has not been counted for at least a predetermined number of times, the method 400 ends. However, if it is determined at operation 406 that the sequence has been counted for at least a predetermined number of times, the method 400 proceeds to operation 408 where a Java macro instruction that represents the sequence of Java Bytecode instructions is generated. The method 400 ends following operation 408.

Figure 5:
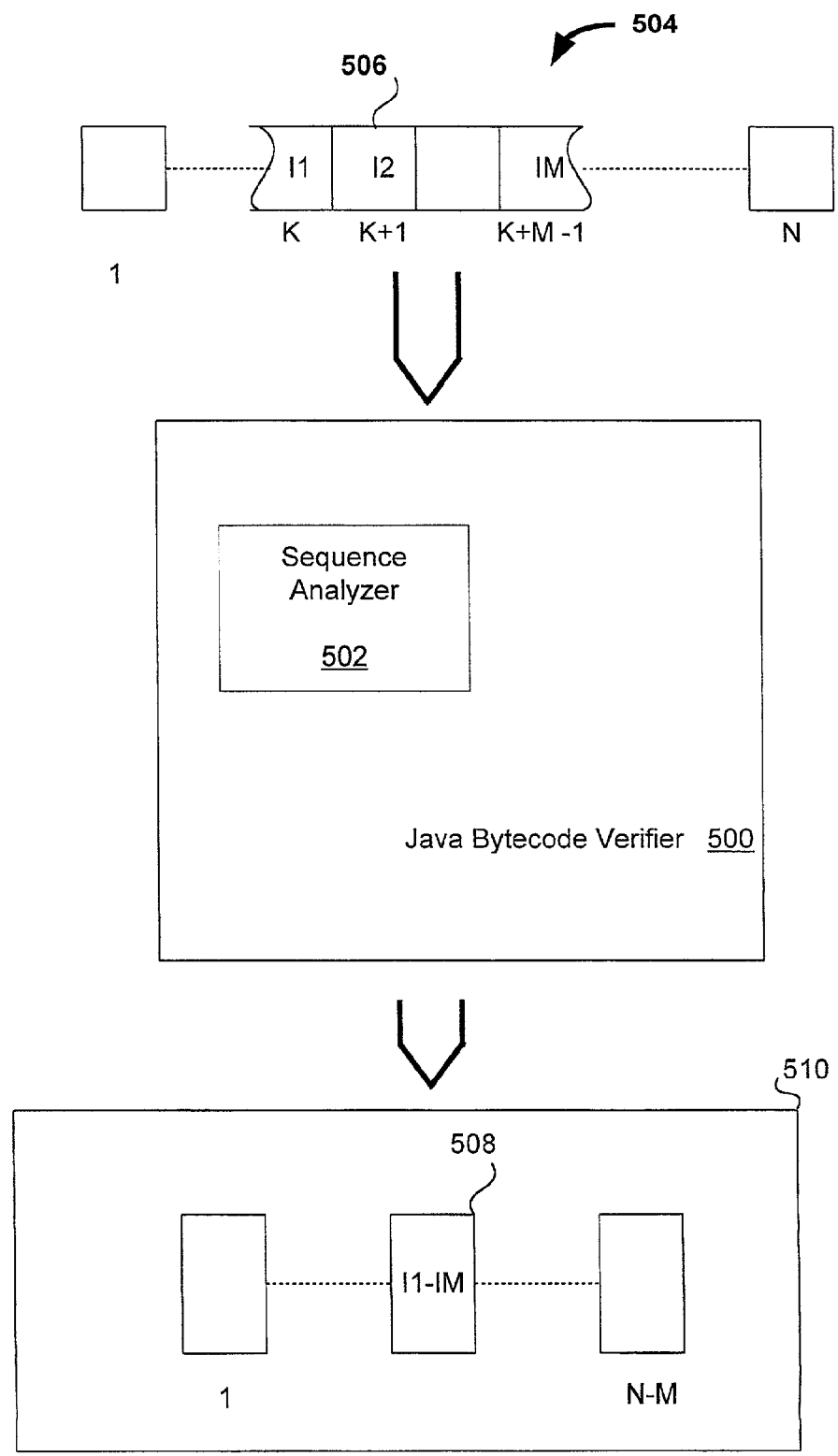
FIG. 5 illustrates a Java Bytecode verifier in accordance with one embodiment of the invention.

FIG. 5 illustrates a Java Bytecode verifier 500 in accordance with one embodiment of the invention. The Java Bytecode verifier 500 includes a sequence analyzer 502 suitable for analyzing a stream of Java Bytecodes 504. As shown in FIG. 5, the stream of Java Bytecodes 504 consists of a sequence of Java Bytecode instructions 1–N. The Java Bytecode verifier 500 operates to determine whether a sequence of two or more Java Bytecode instructions can be represented as a Java macro instruction. If the Bytecode verifier 500 determines that a sequence of two or more Java Bytecode instructions can be represented as a Java macro instruction, the Bytecode verifier 500 produces a Java macro instruction. The Java macro instruction corresponds to the sequence of two or more Java Bytecode instructions. Accordingly, the Java macro instruction can replace the sequence of two or more Java Bytecode instructions in the Java stream.

Referring to FIG. 5, a sequence of two or more Java Bytecode instructions 506 in the stream 504 can be identified by the Java Bytecode verifier 500. The sequence of two or more Java Bytecode instructions 506 (instructions I1–IM) can be located in positions K through (K+M−1) in the stream 504. After identifying the sequence of two or more Java Bytecode instructions 506, the Java Bytecode verifier 500 can operate to replace the sequence with a Java macro instruction 508 (I1–IM). As a result, the stream 504 is reduced to a stream 510 consisting of (N−M) Java Bytecode instructions. As will be appreciated, the Java Bytecode verifier 500 can identify a number of predetermined sequences of Java Bytecode instructions and replace them with the appropriate Java macro instruction. The Java Bytecode verifier 500 can also be implemented to analyze the sequences that appear in the stream 504 and replace only those that meet a criteria (e.g., a sequence that has appeared more than a predetermined number of times). In any case, the number of Java Bytecode instructions in an input stream 504 (e.g., stream 504) can be reduced significantly. Thus, the performance of virtual machines, especially those operating with limited resources, can be enhanced.

As noted above, the Java Bytecode instructions which are replaced in the stream can be conventional Java Bytecode instructions which often appear in a sequence. One such example is the various combinations of the conventional instructions representing "New$_x$" and "Dup$_x$" which typically appear in sequence in order to instantiate a Java object (e.g., New-Dup, Newarray-Dup_x1, Anewarray-Dup_x2, etc.).

Figure 6A:
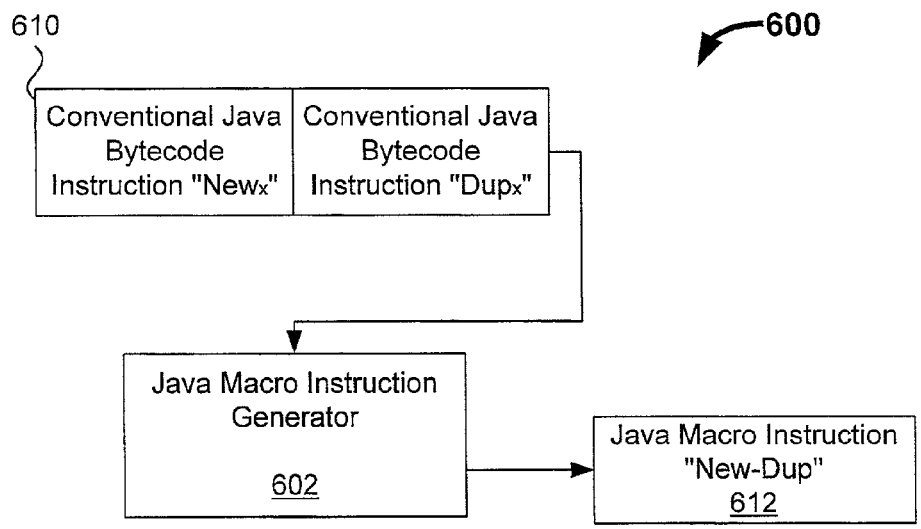
FIGS. 6A–6B illustrate Java computing environments including Java macro instruction generators and Java Bytecode translators in accordance with one embodiment of the invention.

FIG. 6A illustrates a Java computing environment 600 including a Java macro instruction generator 602 in accordance with one embodiment of the invention. Referring now to FIG. 6A, conventional Java Bytecode instructions "New$_x$" and "Dup$_x$" are depicted in a sequence 610. The sequence 610 can be replaced by a single Java macro instruction "New-Dup" 612 by the Java macro instruction generator 602. As will be appreciated by those skilled in the art, the sequence 610 can appear frequently during the execution of Java programs. Thus, replacing this sequence with a single macro instruction can reduce the overhead associated with dispatching Java Bytecode instructions.

Again, it should be noted that the Java macro instruction 602 can also be used in conjunction with a Java Bytecode translator in accordance with one preferred embodiment of the invention. More details about the Java Bytecode translator and inventive Java Bytecode instructions are described in U.S. patent application Ser. No. 09/819,120, entitled "REDUCED INSTRUCTION SET FOR JAVA VIRTUAL MACHINES," and U.S. patent application Ser. No. 09/820,097, entitled "ENHANCED VIRTUAL MACHINE INSTRUCTIONS."

Figure 6B:
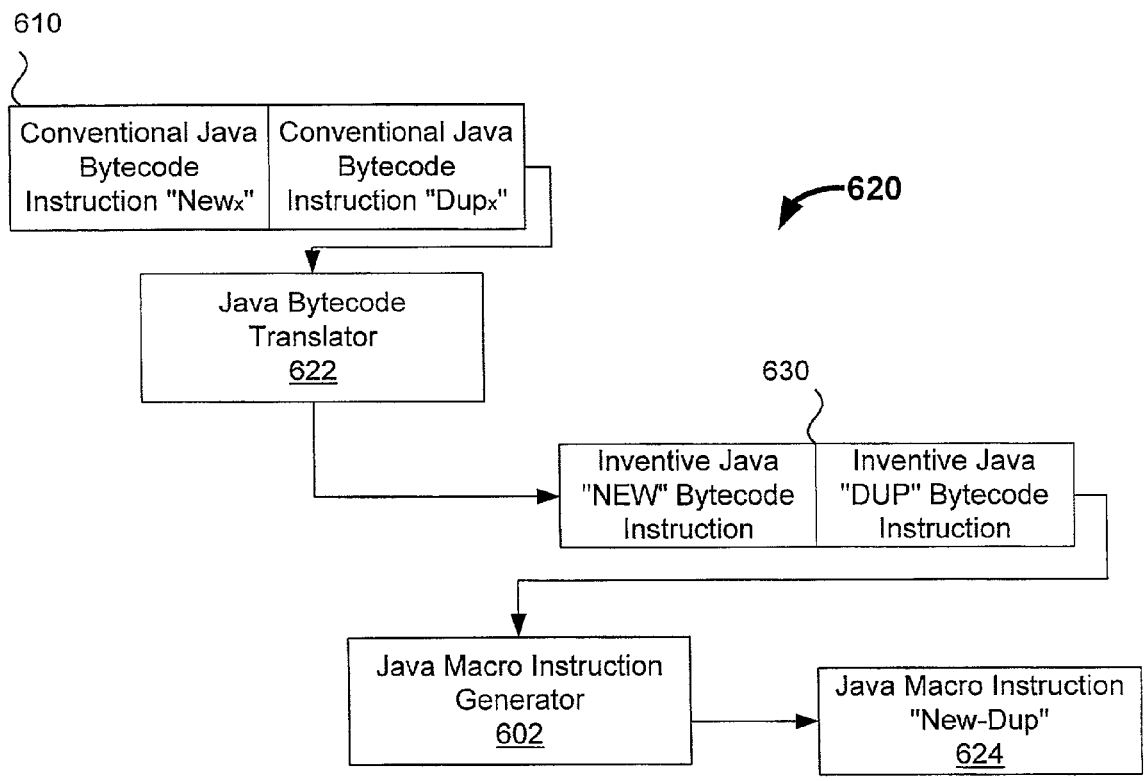

FIG. 6B illustrates a Java computing environment 620, including a Java macro instruction generator 602 and a Java Bytecode translator 622, in accordance with one embodiment of the invention. Referring now to FIG. 6B, the Java Bytecode translator 622 operates to translate conventional Java instructions 610 into inventive Java instructions 630. The Java macro instruction generator 602 can receive the inventive Java instructions 630 and generate a corresponding Java macro instruction "New-Dup" 624.

It should be noted that the inventive Java instructions 630 represent a reduced set of Java instructions suitable for execution by a Java virtual machine. This means that the number of instructions in the inventive reduced set is significantly less than the number of instructions in the conventional Java Bytecode instruction set. Furthermore, the inventive Java instructions provide for inventive operations that cannot be performed by conventional Java Bytecode instructions. By way of example, an inventive virtual machine operation "DUP" (shown in sequence 630) can be provided in accordance with one embodiment of the invention. The inventive virtual machine instruction DUP allows values in various positions on the execution stack to be duplicated on the top of the execution stack.

Figure 7A:
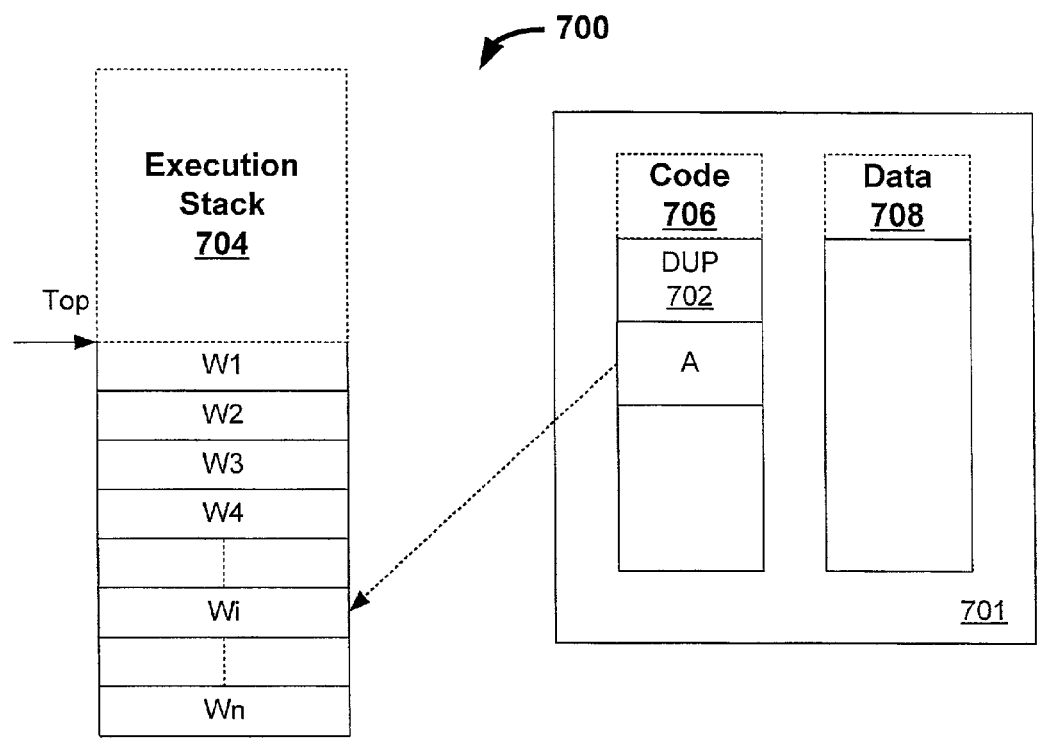
FIG. 7A illustrates a computing environment including an internal representation of an inventive "DUP" instruction suitable for duplicating values on the stack in accordance with one embodiment of the invention.
Figure 7B:
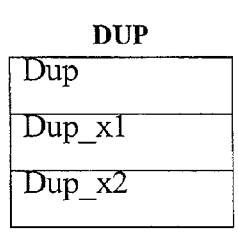
FIGS. 7B–7C illustrate some of the Java Bytecode instructions described in FIG. 7A.
Figure 7C:
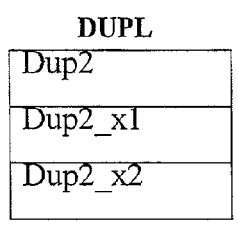

FIG. 7A illustrates a computing environment 700 including an internal representation 701 of an inventive "DUP" instruction 702 suitable for duplicating values on the stack in accordance with one embodiment of the invention. The internal representation 701 includes a pair of streams, namely, a code stream 706 and a data stream 708. In the described embodiment, each entry in the code stream 706 and data stream 708 represents one byte. The inventive virtual machine instruction DUP 702 is associated with a data parameter A in the code stream 706. It should be noted that data parameter A may also be implemented in the data stream 708. In any case, the data parameter A indicates which 4 byte value (word value) on an execution stack 704 should be duplicated on the top of the execution stack 704. The data parameter A can indicate, for example, an offset from the top of the execution stack 704. As shown in FIG. 7A, the data parameter A can be a reference to "Wi," a word (4 byte) value on the execution stack. Accordingly, at execution time, the virtual machine can execute the "DUP" command 702. As a result, the Wi word will be duplicated on the top of the stack. Thus, the inventive "DUP" instruction can effectively replace various Java Bytecode instructions that operate to duplicate 4 byte values on top of the execution stack. FIG. 7B illustrates some of these Java Bytecode instructions. Similarly, as illustrated in FIG. 7C, an inventive "DUPL" instruction can be provided to effectively replace various Java Bytecode instructions that operate to duplicate 8 byte values (2 words) on top of the execution stack.

It should be noted that conventional Java Bytecode "Dup$_x$" instructions only allow for duplication of values in certain positions on the execution stack (i.e., conventional instructions Dup, Dup_x1 and Dup_x2 respectively allow duplication of the first, second and third words on the execution stack). However, the inventive instructions "DUP" and "DUPL" can be used to duplicate a much wider range of values on the execution stack (e.g., W4, Wi, WN, etc.).

Referring back to FIG. 6B, another inventive instruction, Java Bytecode instruction "New" is shown in the sequence 630. The Java Bytecode instruction "New" can effectively replace various conventional Java Bytecodes used for instantiation.

Figure 8:
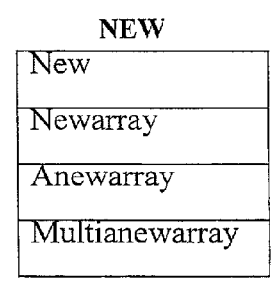
FIG. 8 illustrates a mapping of Java Bytecode instantiation instructions to the virtual machine instructions provided in accordance with one embodiment of the invention.

FIG. 8 illustrates a mapping of Java Bytecode instantiation instructions to the virtual machine instructions provided in accordance with one embodiment of the invention. As will be appreciated, the four conventional Java Bytecode instructions can effectively be mapped into a single virtual machine instruction (e.g., NEW). The virtual machine instruction NEW operates to instantiate objects and arrays of various types. In one embodiment, the inventive virtual machine instruction NEW operates to determine the types of the objects or arrays based on the parameter value of the Java Bytecode instantiation instruction. As will be appreciated, the Java Bytecode instructions for instantiation are typically followed by a parameter value that indicates the type. Thus, the parameter value is readily available and can be used to allow the NEW virtual machine instruction to instantiate the appropriate type at execution time.

Figure 9A:
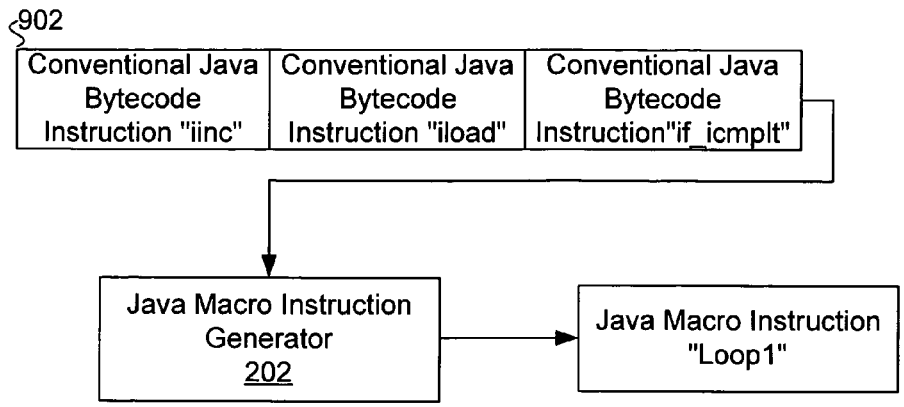
FIG. 9A illustrates another sequence of conventional Java Bytecodes that can be executed frequently by a Java interpreter.

FIG. 9A illustrates another sequence 902 of conventional Java Bytecodes that can be executed frequently by a Java interpreter. The sequence 902 represents an exemplary sequence of instructions that are used in programming loops. As such, sequences, such as the sequence 902, can be repeated over and over again during the execution of Java Bytecode instructions. As shown in FIG. 9A, the Java macro instruction generator 202 can replace the conventional sequence of Java instructions "iinc," "iload," and "if_cmplt" with a Java macro instruction "Loop 1."

Figure 9B:
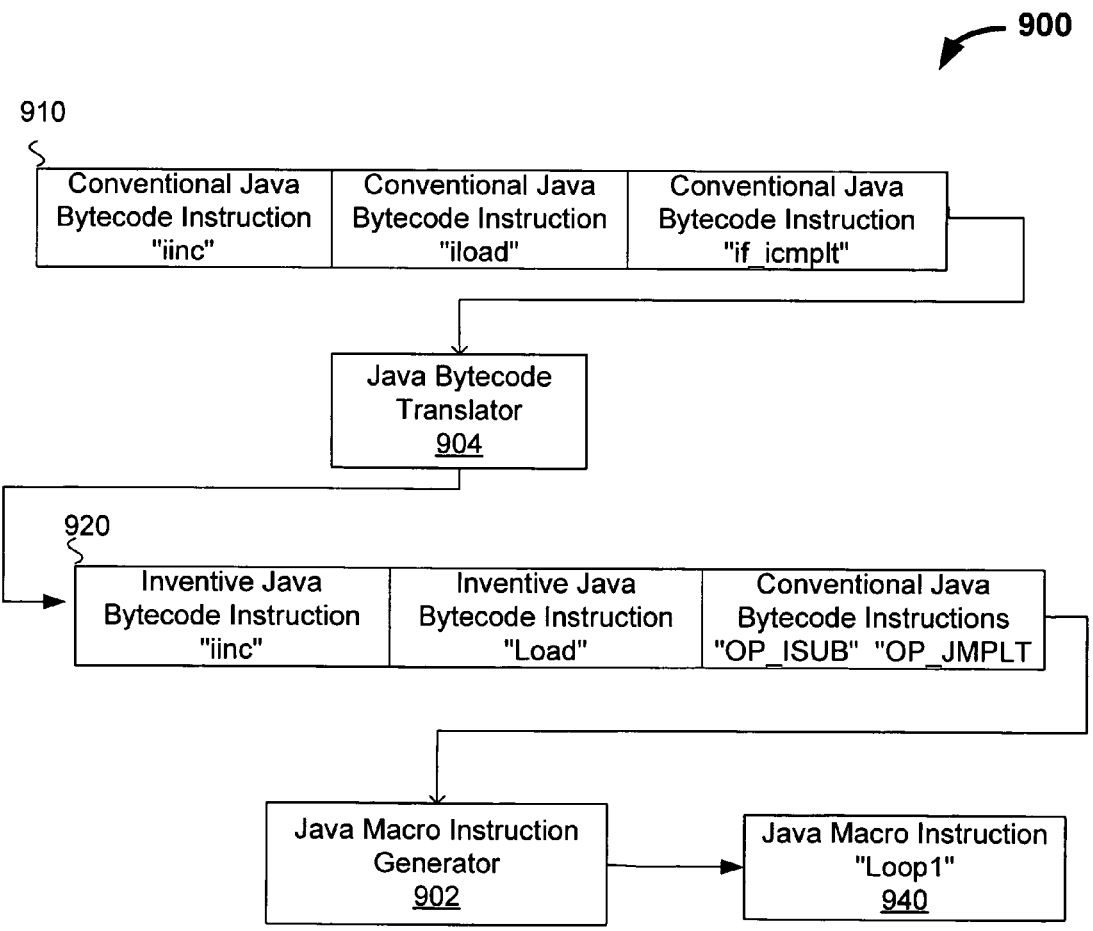
FIG. 9B illustrates a Java computing environment including a Java macro instruction generator and a Java Bytecode translator in accordance with another embodiment of the invention.

FIG. 9B illustrates a Java computing environment 900, including a Java macro instruction generator 902 and a Java Bytecode translator 904, in accordance with one embodiment of the invention. Referring now to FIG. 9B, the Java Bytecode translator 904 operates to translate conventional Java instructions 910 into inventive Java instructions 920. The Java macro instruction generator 902 can receive the inventive Java instructions 920 and generate a corresponding Java macro instruction "Loop 1" 940.

Figure 10A:
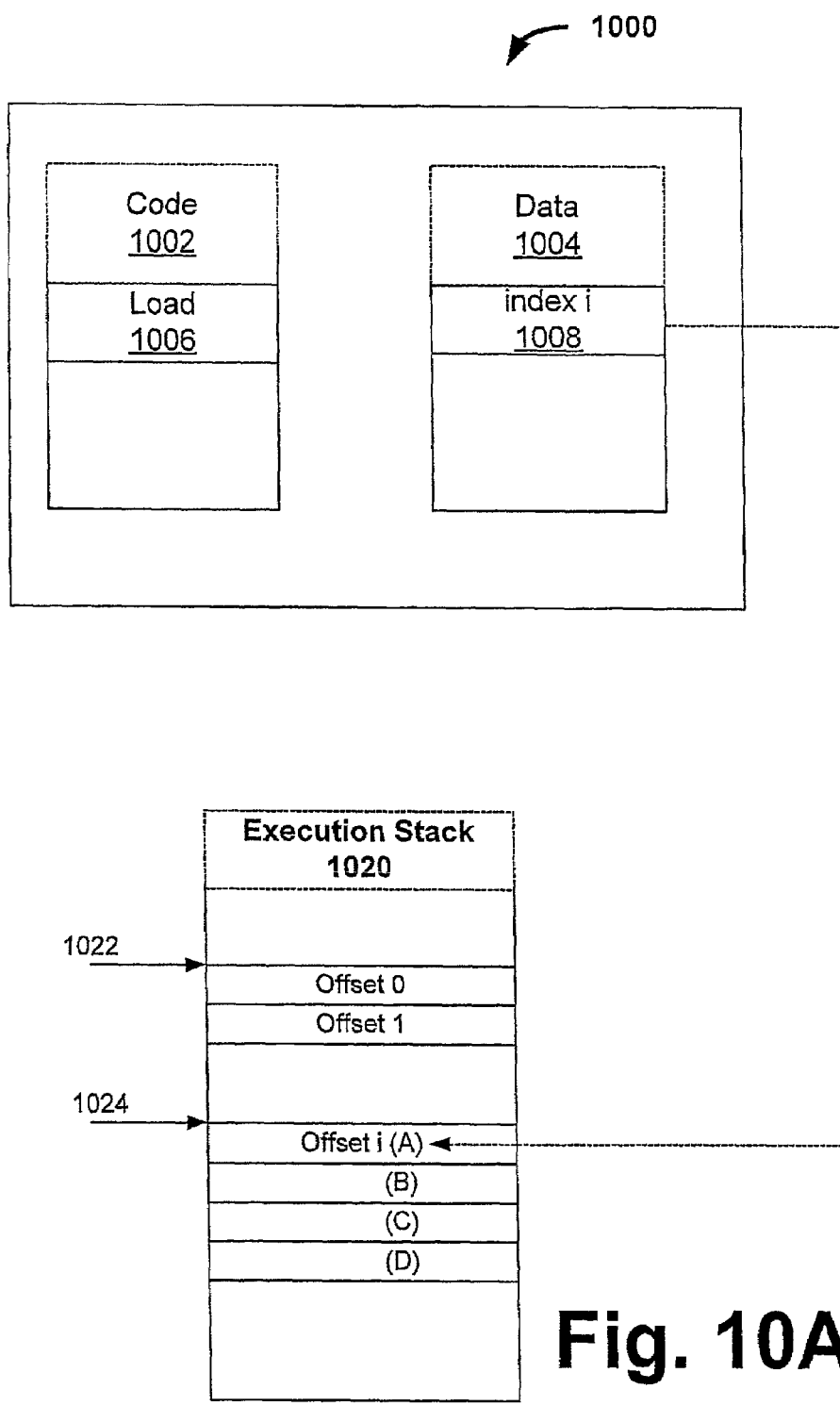
FIG. 10A illustrates an internal representation of a set of Java "Load" instructions suitable for loading values from a local variable in accordance with another embodiment of the invention.

One of the inventive instructions in the sequence 920 is the inventive instruction "Load." FIG. 10A illustrates an internal representation 1000 of a set of Java "Load" instructions suitable for loading values from a local variable in accordance with another embodiment of the invention. In the described embodiment, a code stream 1002 of the internal representation 1000 includes a Load command 1006 representing an inventive virtual machine instruction suitable for representation of one or more Java "Load from a local variable" Bytecode instructions. It should be noted that the Load command 1006 has a one byte parameter associated with it, namely, an index i 1008 in the data stream 1004. As will be appreciated, at run time, the Load command 1006 can be executed by a virtual machine to load (or push) a local variable on top of the execution stack 1020. By way of example, an offset 0 1022 can indicate the starting offset for the local variables stored on the execution stack 1020. Accordingly, an offset i 1024 identifies the position in the execution stack 1020 which corresponds to the index i 1008.

It should be noted that in the described embodiment, the Load command 1006 is used to load local variables as 4 bytes (one word). As a result, the value indicated by the 4 bytes A, B, C and D (starting at offset i 1024) is loaded on the top of the execution stack 1020 when the Load command 1006 is executed. In this manner, the Load command 1006 and index i 1008 can be used to load (or push) 4 byte local variables on top of the execution stack at run time. As will be appreciated, the Load command 1006 can effectively represent various conventional Java Bytecode instructions.

FIG. 10B illustrates a set of Java Bytecode instructions for loading 4 byte local variables that can be represented by an inventive "Load" command in accordance with one embodiment of the invention.

It should be noted that the invention also provides for loading local variables that do not have values represented by 4 bytes. For example, FIG. 10C illustrates a set of Java Bytecode instructions for loading 8 byte local variables in accordance with one embodiment of the invention. As will be appreciated, all of the Java Bytecode instructions listed in FIG. 10C can be represented by a single inventive virtual machine instruction (e.g., a "LoadL" command). The "LoadL" command can operate, for example, in a similar manner as discussed above.

Referring back to FIG. 9B, the Java Bytecode translator 904 operates to replace the conventional Bytecode instruction "if_cmplt" in the sequence 910 with the two Bytecode instructions "OP_ISUB" and "OP_JMPLT" in the reduced set of Java Bytecode instructions. As will be appreciated, two or more of the inventive virtual machine instructions can be combined to perform relatively more complicated operations in accordance with one embodiment of the invention. By way of example, the conditional flow control operation performed by the Java Bytecode instruction "lcmp" (compare two long values on the stack and, based on the comparison, push 0 or 1 on the stack) can effectively be performed by performing an inventive virtual machine instruction LSUB (Long subdivision) followed by another inventive virtual machine instruction JMPEQ (Jump if equal). FIGS. 11A and 11B illustrate some conventional Java Bytecode instructions for performing conditional flow operations which can be represented by two inventive virtual machine instructions in accordance with one embodiment of the invention.

Figure 12A:
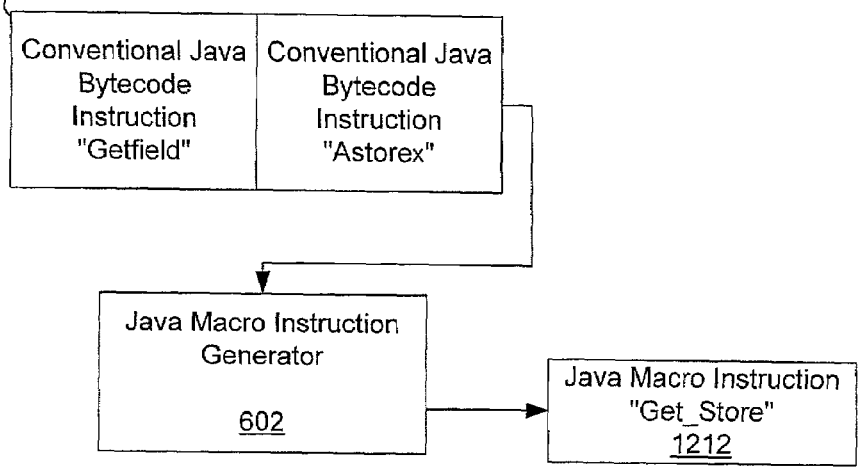
FIG. 12A illustrates yet another sequence of conventional Java Bytecodes that can be executed frequently by a Java interpreter.

FIG. 12A illustrates yet another sequence 1210 of conventional Java Bytecodes that can be executed frequently by a Java interpreter. The sequence 1210 represents an exemplary sequence of instructions that perform to obtain a field value and put it on the execution stack. As shown in FIG. 12A, the Java macro instruction generator 602 can replace the conventional sequence 1210 of Java instructions "Getfield" and "Astore$_x$" with a Java macro instruction "Get_Store" 1212. The conventional instruction "Astore$_x$" represents various conventional Java instructions used to store values on the execution stack.

Figure 12B:
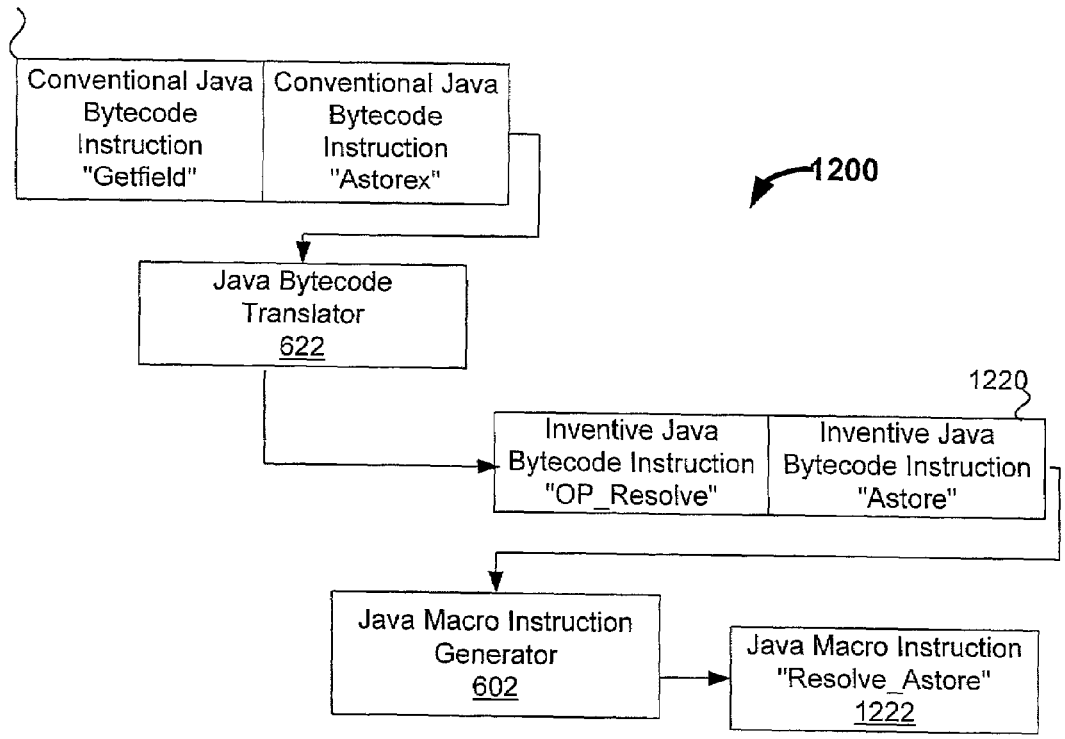
FIG. 12B illustrates the Java Bytecode translator operating to translate conventional Java instructions into inventive Java instructions.

FIG. 12B illustrates a Java computing environment 1200, including a Java macro instruction generator 602 and a Java Bytecode translator 622, in accordance with one embodiment of the invention. Referring now to FIG. 12B, the Java Bytecode translator 622 operates to translate conventional Java instructions 1210 into inventive Java instructions 1220. The Java macro instruction generator 602 can receive the inventive Java instructions 1220 and generate a corresponding Java macro instruction "Resolve_Astore" 1222.

Figure 13A:
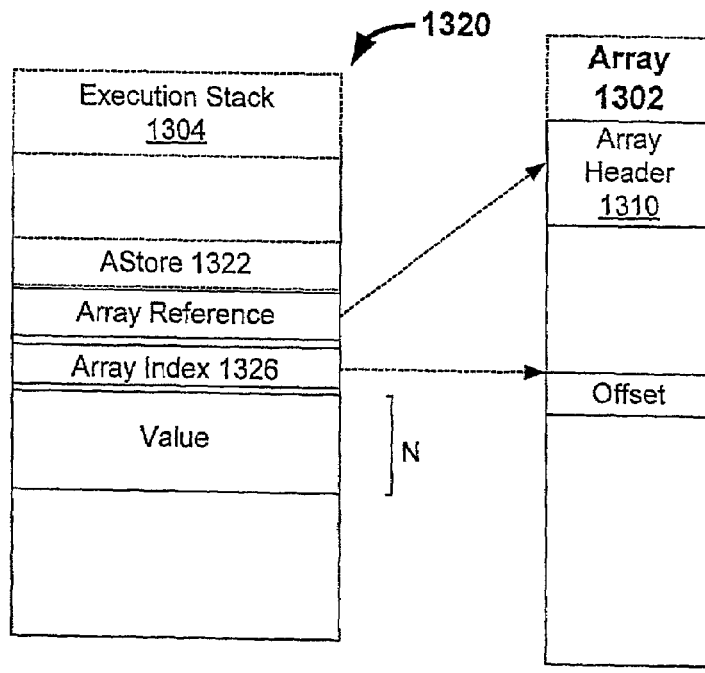
FIG. 13A illustrates a computing environment in accordance with one embodiment of the invention.
Figure 13B:
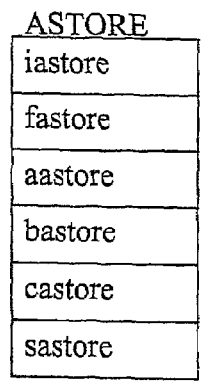
FIGS. 13B and 13C illustrate a set of conventional Java Bytecode instructions for storing arrays that can be represented by an inventive virtual machine instruction (e.g., Astore) in accordance with one embodiment of the invention.
Figure 13C:
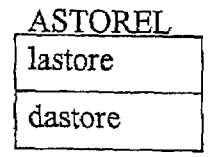

The inventive instruction "Astore" represents a virtual machine instruction suitable for storing values into arrays. By way of example, FIG. 13A illustrates a computing environment 1320 in accordance with one embodiment of the invention. An inventive AStore 1322 (store into array) virtual machine instruction can be used to store various values from the execution stack 1304 into different types of arrays in accordance with one embodiment of the invention. Again, the header 1310 of the array 1302 can be read to determine the array's type. Based on the array's type, the appropriate value (i.e., the appropriate number of bytes N on the execution stack 1304) can be determined. This value can then be stored in the array 1302 by using the array-index 1326. Thus, the inventive virtual machine instruction AStore can effectively represent various Java Bytecode instructions that are used to store values into an array. FIGS. 13B and 13C illustrate a set of conventional Java Bytecode instructions for storing arrays that can be represented by an inventive virtual machine instruction (e.g., Astore) in accordance with one embodiment of the invention.

Appendix A illustrates mapping of a set of conventional Java Bytecode instructions to one or more of the inventive virtual machine instructions listed in the right column.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX A

| | |
|---|---|
| nop | IGNORE_OPCODE |
| aconst_null | OP_PUSHB |
| iconst_ml | OP_PUSHB |
| iconst_0 | OP_PUSHB |
| iconst_1 | OP_PUSHB |
| iconst_2 | OP_PUSHB |
| iconst_3 | OP_PUSHB |
| iconst_4 | OP_PUSHB |
| iconst_5 | OP_PUSHB |
| lconst_0 | OP_PUSHL |
| lconst_1 | OP_PUSHL |
| fconst_0 | OP_PUSH |
| fconst_1 | OP_PUSH |
| fconst_2 | OP_PUSH |
| dconst_0 | OP_PUSHL |
| dconst_1 | OP_PUSHL |
| bipush | OP_PUSHB |
| sipush | OP_PUSH |
| ldc | OP_PUSH |
| ldc_w | OP_PUSH |
| ldc2_w | OP_PUSHL |
| iload | OP_LOAD |
| lload | OP_LOADL |
| fload | OP_LOAD |
| dload | OP_LOADL |
| aload | OP_LOAD |
| iload_0 | OP_LOAD |
| iload_1 | OP_LOAD |
| iload_2 | OP_LOAD |
| iload_3 | OP_LOAD |
| lload_0 | OP_LOADL |
| lload_1 | OP_LOADL |
| lload_2 | OP_LOADL |
| lload_3 | OP_LOADL |
| fload_0 | OP_LOADL |
| fload_1 | OP_LOAD |
| fload_2 | OP_LOAD |
| fload_3 | OP_LOAD |
| dload_0 | OP_LOADL |
| dload_1 | OP_LOADL |
| dload_2 | OP_LOADL |
| dload_3 | OP_LOADL |
| aload_0 | OP_LOAD |
| aload_1 | OP_LOAD |
| aload_2 | OP_LOAD |
| aload_3 | OP_LOAD |
| iaload | OP_ALOAD |
| laload | OP_ALOAD |
| faload | OP_ALOAD |
| daload | OP_ALOAD |
| aaload | OP_ALOAD |
| baload | OP_ALOAD |
| caload | OP_ALOAD |
| saload | OP_ALOAD |
| istore | OP_STOR |

APPENDIX A-continued

| | |
|---|---|
| lstore | OP_STORL |
| fstore | OP_STOR |
| dstore | OP_STORL |
| astore | OP_STOR |
| istore_0 | OP_STOR |
| istore_1 | OP_STOR |
| istore_2 | OP_STOR |
| istore_3 | OP_STOR |
| lstore_0 | OP_STORL |
| lstore_1 | OP_STORL |
| lstore_2 | OP_STORL |
| lstore_3 | OP_STORL |
| fstore_0 | OP_STOR |
| fstore_1 | OP_STOR |
| fstore_2 | OP_STOR |
| fstore_3 | OP_STOR |
| dstore_0 | OP_STORL |
| dstore_1 | OP_STORL |
| dstore_2 | OP_STORL |
| dstore_3 | OP_STORL |
| astore_0 | OP_STOR |
| astore_1 | OP_STOR |
| astore_2 | OP_STOR |
| astore_3 | OP_STOR |
| iastore | OP_ASTORE |
| lastore | OP_ASTOREL |
| fastore | OP_ASTORE |
| dastore | OP_ASTOREL |
| aastore | OP_ASTORE |
| bastore | OP_ASTORE |
| castore | OP_ASTORE |
| sastore | OP_ASTORE |
| pop | OP_POP |
| pop2 | OP_POP |
| dup | OP_DUP |
| dup_x1 | OP_DUP |
| dup_x2 | OP_DUP |
| dup2 | OP_DUPL |
| dup2_x1 | OP_DUPL |
| dup2_x2 | OP_DUPL |
| swap | OP_SWAP |
| iadd | OP_IADD |
| ladd | OP_LADD |
| fadd | OP_FADD |
| dadd | OP_DADD |
| isub | OP_ISUB |
| lsub | OP_LSUB |
| fsub | OP_FSUB |
| dsub | OP_DSUB |
| imul | OP_IMUL |
| lmul | OP_LMUL |
| fmul | OP_FMUL |
| dmul | OP_DMUL |
| idiv | OP_IDIV |
| ldiv | OP_LDIV |
| fdiv | OP_FDIV |
| ddiv | OP_DDIV |
| irem | OP_IREM |
| lrem | OP_LREM |
| frem | OP_FREM |
| drem | OP_DREM |
| ineg | OP_INEG |
| lneg | OP_LNEG |
| fneg | OP_FNEG |
| dneg | OP_DNEG |
| ishl | OP_ISHL |
| lshl | OP_LSHL |
| ishr | OP_ISHR |
| lshr | OP_LSHR |
| iushr | OP_IUSHR |
| lushr | OP_LUSHR |
| iand | OP_IAND |
| land | OP_LAND |
| ior | OP_IOR |
| lor | OP_LOR |
| ixor | OP_IXOR |
| lxor | OP_LXOR |
| iinc | OP_IINC |
| i2l | OP_I2L |

APPENDIX A-continued

| | |
|---|---|
| i2f | IGNORE_OPCODE |
| i2d | OP_I2D |
| l2i | OP_L2I |
| l2f | OP_L2F |
| l2d | OP_L2D |
| f2i | IGNORE_OPCODE |
| f2l | OP_F2L |
| f2d | OP_F2D |
| d2i | OP_D2I |
| d2l | OP_D2L |
| d2f | OP_D2F |
| i2b | IGNORE_OPCODE |
| i2c | IGNORE_OPCODE |
| i2s | IGNORE_OPCODE |
| lcmp | OP_LSUB, OP_JMPEQ |
| fcmpl | OP_FSUB, OP_JMPLE |
| fcmpg | OP_FSUB, OP_JMPGE |
| dcmpl | OP_DCMP, OP_JMPLE |
| dcmpg | OP_DCMP, OP_JMPGE |
| ifeq | OP_JMPEQ |
| ifne | OP_JMPNE |
| iflt | OP_JMPLT |
| ifge | OP_JMPGE |
| ifgt | OP_JMPGT |
| ifle | OP_JMPLE |
| if_icmpeq | OP_ISUB, OP_JMPEQ |
| if_icmpne | OP_ISUB, OP_JMPNE |
| if_icmplt | OP_ISUB, OP_JMPLT |
| if_icmpge | OP_ISUB, OP_JMPGE |
| if_icmpgt | OP_ISUB, OP_JMPGT |
| if_icmple | OP_ISUB, OP_JMPLE |
| if_acmpeq | OP_ISUB, OP_JMPEQ |
| if_acmpne | OP_ISUB, OP_JMPNE |
| goto | OP_JMP |
| jsr | OP_JSR |
| ret | OP_RET |
| tableswitch | OP_SWITCH |
| lookupswitch | OP_SWITCH |
| ireturn | OP_RETURN |
| lreturn | OP_LRETURN |
| freturn | OP_RETURN |
| dreturn | OP_LRETURN |
| areturn | OP_RETURN |
| return | OP_RETURNV |
| getstatic | OP_RESOLVE |
| putstatic | OP_RESOLVEP |
| getfield | OP_RESOLVE |
| putfield | OP_RESOLVEP |
| invokevirtual | OP_RESOLVE |
| invokespecial | OP_RESOLVE |
| invokestatic | OP_RESOLVE |
| invokeinterface | OP_RESOLVE |
| xxxunusedxxx | IGNORE_OPCODE |
| new | OP_NEW |
| newarray | OP_NEW |
| anewarray | OP_NEW |
| arraylength | OP_ARRAYLENGTH |
| athrow | OP_THROW |
| checkcast | IGNORE_OPCODE |
| instanceof | OP_INSTANCEOF |
| monitorenter | OP_MUTEXINC |
| monitorexit | OP_MUTEXDEC |
| wide | OP_WIDE |
| multianewarray | OP_NEW |
| ifnull | OP_JMPEQ |
| ifnonnull | OP_JMPNE |
| goto_w | OP_JMP |
| jsr_w | OP_JSR |

The invention claimed is:

1. A method of instantiating objects by a virtual machine, said method comprising:

receiving a first sequence of bytecodes to be executed by said virtual machine, wherein said first sequence of bytecodes is selected from a defined first set of executable virtual machine instructions implemented to conform with a virtual machine specification that includes said defined first set of executable virtual machine instructions;

selecting, at load time, a first-reduced instruction from a reduced-set of virtual machine instructions, wherein said first-reduced instruction represents two or more different virtual machine instructions in said first sequences of virtual machine instructions that were selected from said defined first set of executable virtual machine instructions, the virtual machine being arranged to execute the reduced-set of virtual machine instructions that provide substantially all of the functionality provided by said defined first set of virtual machine instructions, and wherein every one of the instructions in said defined first set of virtual machine instructions can be represented by at least one of the virtual machine instructions in the reduced-set of virtual machine instructions, and wherein said reduced-set of virtual machine instructions consists of a number of virtual machine instructions which is less than the number executable virtual machine instructions in said defined first set of virtual machine instructions;

translating, at load time, said two or more different virtual machine instructions in said first sequence into said first-reduced instruction from said reduced-set of virtual machine instructions;

determining, after said translating, a second sequence of bytecodes that includes said first-reduced instruction, thereby representing said first sequence of bytecodes with a second sequence which includes at least said first-reduced instruction, selected from said reduced-set of virtual machine instruction, that replaces said two or more different virtual machine instructions in said first sequence;

determining, at load time, whether said second sequence of bytecodes includes an instantiation instruction immediately followed by a duplicate stack instruction;

determining, at load time, a macro instruction that represents said instantiation instruction and said duplicate stack instruction that immediately follows said instantiation instruction;

loading in said virtual machine prior to execution time, said macro instruction instead of said instantiation instruction and said duplicate stack instruction; and executing said macro instruction to instantiate a new object.

2. A method as recited in claim 1, wherein said macro instruction is generated during a bytecode verification phase.

3. A method as recited in claim 1, wherein said virtual machine internally represents instructions as a pair of streams.

4. A method as recited in claim 3,
wherein said pair of streams includes a code stream and a data stream,
wherein said code stream is suitable for containing a code portion of said macro instruction, and
wherein said data stream is suitable for containing.

5. A method as recited in claim 4,
wherein said macro instruction is generated only when said virtual machine determines that said macro instruction should be generated.

6. A method as recited in claim 5, wherein said determination of whether said macro instruction should be generated is made based on a predetermined criteria.

7. A method as recited in claim 6, wherein said predetermined criteria is whether an instantiation instruction is immediately followed by a duplicate stack more than a predetermined number of times.

8. A computer system for instantiating objects by a virtual machine, wherein said computer system operates to:
  receive a first sequence of bytecodes to be executed by said virtual machine, wherein said first sequence of bytecodes is selected from a defined first set of executable virtual machine instructions implemented to conform with a virtual machine specification that includes said defined first set of executable virtual machine instructions;
  select, at load time, a first-reduced instruction from a reduced-set of virtual machine instructions, wherein said first-reduced instruction represents two or more different virtual machine instructions in said first sequences of virtual machine instructions that were selected from said defined first set of executable virtual machine instructions, the virtual machine being arranged to execute the reduced-set of virtual machine instructions that provide substantially all of the functionality provided by said defined first set of virtual machine instructions, and wherein every one of the instructions in said defined first set of virtual machine instructions can be represented by at least one of the virtual machine instructions in the reduced-set of virtual machine instructions, and wherein said reduced-set of virtual machine instructions consists of a number of virtual machine instructions which is less than the number executable virtual machine instructions in said defined first set of virtual machine instructions;
  translate, at load time, said two or more different virtual machine instructions in said first sequence into said first-reduced instruction from said reduced-set of virtual machine instructions;
  determine, after said translating, a second sequence of bytecodes that includes said first-reduced instruction, thereby representing said first sequence of bytecodes with a second sequence which includes at least said first-reduced instruction, selected from said reduced-set of virtual machine instruction, that replaces said two or more different virtual machine instructions in said first sequence;
  determine, at load time, whether said second sequence of bytecodes includes an instantiation instruction immediately followed by a duplicate stack instruction;
  determine, at load time, a macro instruction that represents said instantiation instruction and said duplicate stack instruction that immediately follows said instantiation instruction;
  load in said virtual machine prior to execution time, said macro instruction instead of said instantiation instruction and said duplicate stack instruction; and
  execute said macro instruction to instantiate a new object.

9. A computer system as recited in claim 8, wherein said macro instruction is generated during a bytecode verification phase.

10. A computer system as recited in claim 8, wherein said virtual machine internally represents instructions as a pair of streams.

11. A computer system as recited in claim 10,
  wherein said pair of streams includes a code stream and a data stream,
  wherein said code stream is suitable for containing a code portion of said macro instruction, and
  wherein said data stream is suitable for containing a data portion.

12. A computer system as recited in claim 8, wherein said macro instruction is generated only when said virtual machine determines that said macro instruction should be generated.

13. A computer system as recited in claim 12, wherein said determination of whether said macro instruction should be generated is made based on a predetermined criteria.

14. A computer system as recited in claim 13, wherein said predetermined criteria is whether an instantiation instruction is immediately followed by a duplicate stack instruction more than a predetermined number of times.

15. A computer readable medium including computer program code for instantiating objects by a virtual machine, comprising:
  computer program code for receiving a first sequence of bytecodes to be executed by said virtual machine, wherein said first sequence of bytecodes is selected from a defined first set of executable virtual machine instructions implemented to conform with a virtual machine specification that includes said defined first set of executable virtual machine instructions;
  computer program code for selecting, at load time, a first-reduced instruction from a reduced-set of virtual machine instructions, wherein said first-reduced instruction represents two or more different virtual machine instructions in said first sequences of virtual machine instructions that were selected from said defined first set of executable virtual machine instructions, the virtual machine being arranged to execute the reduced-set of virtual machine instructions that provide substantially all of the functionality provided by said defined first set of virtual machine instructions, and wherein every one of the instructions in said defined first set of virtual machine instructions can be represented by at least one of the virtual machine instructions in the reduced-set of virtual machine instructions, and wherein said reduced-set of virtual machine instructions consists of a number of virtual machine instructions which is less than the number executable virtual machine instructions in said defined first set of virtual machine instructions;
  computer program code for translating, at load time, said two or more different virtual machine instructions in said first sequence into said first-reduced instruction from said reduced-set of virtual machine instructions;
  computer program code for determining, after said translating, a second sequence of bytecodes that includes said first-reduced instruction, thereby representing said first sequence of bytecodes with a second sequence which includes at least said first-reduced instruction, selected from said reduced-set of virtual machine instruction, that replaces said two or more different virtual machine instructions in said first sequence;
  computer program code for determining, at load time, whether said second sequence of bytecodes includes an instantiation instruction immediately followed by a duplicate stack instruction;
  computer program code for determining, at load time, a macro instruction that represents said instantiation instruction and said duplicate stack instruction that immediately follows said instantiation instruction;
  computer program code for loading in said virtual machine prior to execution time, said macro instruction instead of said instantiation instruction and said duplicate stack instruction; and
  computer program code for executing said macro instruction to instantiate a new object.

16. A computer readable medium as recited in claim 15, wherein said macro instruction is generated during a bytecode verification phase.

17. A computer readable medium as recited in claim 15, wherein said virtual machine internally represents instructions as a pair of streams.

18. A computer readable medium as recited in claim 17,
wherein said pair of streams includes a code stream and a data stream,
wherein said code stream is suitable for containing a code portion of said macro instruction, and
wherein said data stream is suitable for containing data.

19. A computer readable medium as recited in claim 15, wherein said macro instruction is generated only when said virtual machine determines that said macro instruction should be generated.

20. A computer readable medium as recited in claim 19, wherein said determination of whether said macro instruction should be generated is made based on a predetermined criteria.

21. A computer readable medium as recited in claim 20, wherein said predetermined criteria is whether an instantiation instruction is immediately followed by a duplicate stack instruction more than a predetermined number of times.

* * * * *